United States Patent [19]

Watanabe et al.

[11] Patent Number: 4,854,517

[45] Date of Patent: Aug. 8, 1989

[54] APPARATUS HAVING MEANS FOR UNLOOSENLY WINDING A TAPE TO REELS OF A TAPE CASSETTE

[75] Inventors: Toshihiro Watanabe; Shiro Fujiwara, both of Miyagi, Japan

[73] Assignee: Sony Corporation, Tokyo, Japan

[21] Appl. No.: 193,094

[22] Filed: May 12, 1988

[30] Foreign Application Priority Data

May 29, 1987 [JP] Japan ................. 62-135539

[51] Int. Cl.$^4$ .................. B65H 21/00; B65H 19/00
[52] U.S. Cl. .................. 242/56 R; 156/502; 156/506; 242/58.1
[58] Field of Search .............. 242/56 R, 66, 75.4; 156/502, 503, 504, 505, 506, 507

[56] References Cited

U.S. PATENT DOCUMENTS

| | | | |
|---|---|---|---|
| 3,717,314 | 2/1973 | King | 242/56 R |
| 4,139,166 | 2/1979 | Powell et al. | 242/66 |
| 4,216,052 | 8/1980 | Zielke | 242/56 R |
| 4,632,327 | 12/1986 | Kreeft et al. | 242/56 R |
| 4,699,328 | 10/1987 | Kreeft et al. | 242/56 R |

Primary Examiner—David Werner
Assistant Examiner—John M. Eghtessad
Attorney, Agent, or Firm—Alvin Sinderbrand

[57] ABSTRACT

In an apparatus for smoothly winding a magnetic tape on reels of a tape cassette; the cassette is positioned in a holder and has a leader tape wound, at its ends, on the cassette reels, and being withdrawn from the cassette housing by a pair of guide rollers movable away from the cassette in the holder, a splicing device severs the withdrawn leader tape and connects one end of the severed leader tape to an end of a magnetic tape from an external source, and a winding smoothing element, for example, in the form of a roller, is moved into contact with a tape winding face of one of the reels and with successive turns of the magnetic tape wound on such face as that one reel is driven so that the magnetic tape is regularly and smoothly wound on the reel and looseness of the wound tape is avoided.

4 Claims, 4 Drawing Sheets

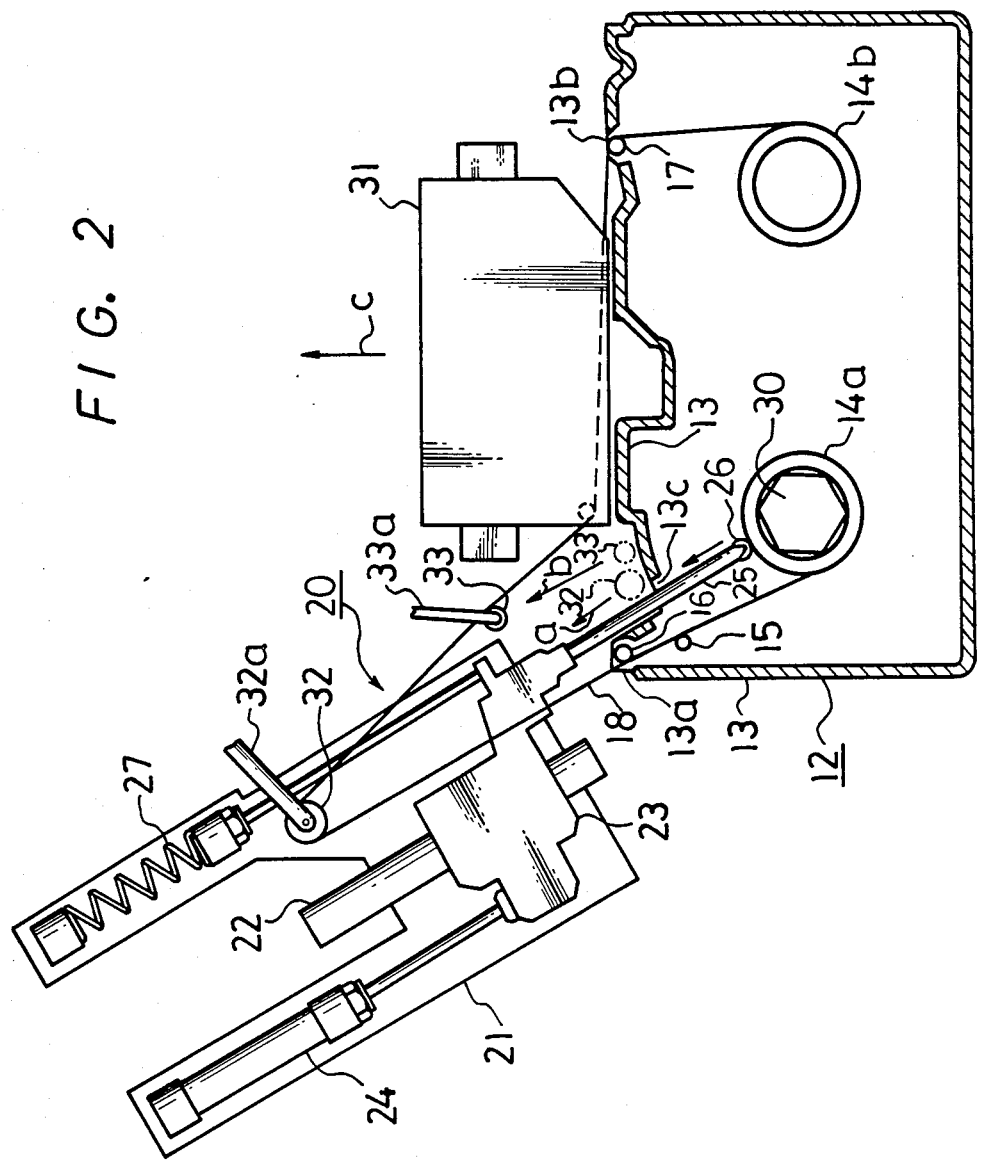

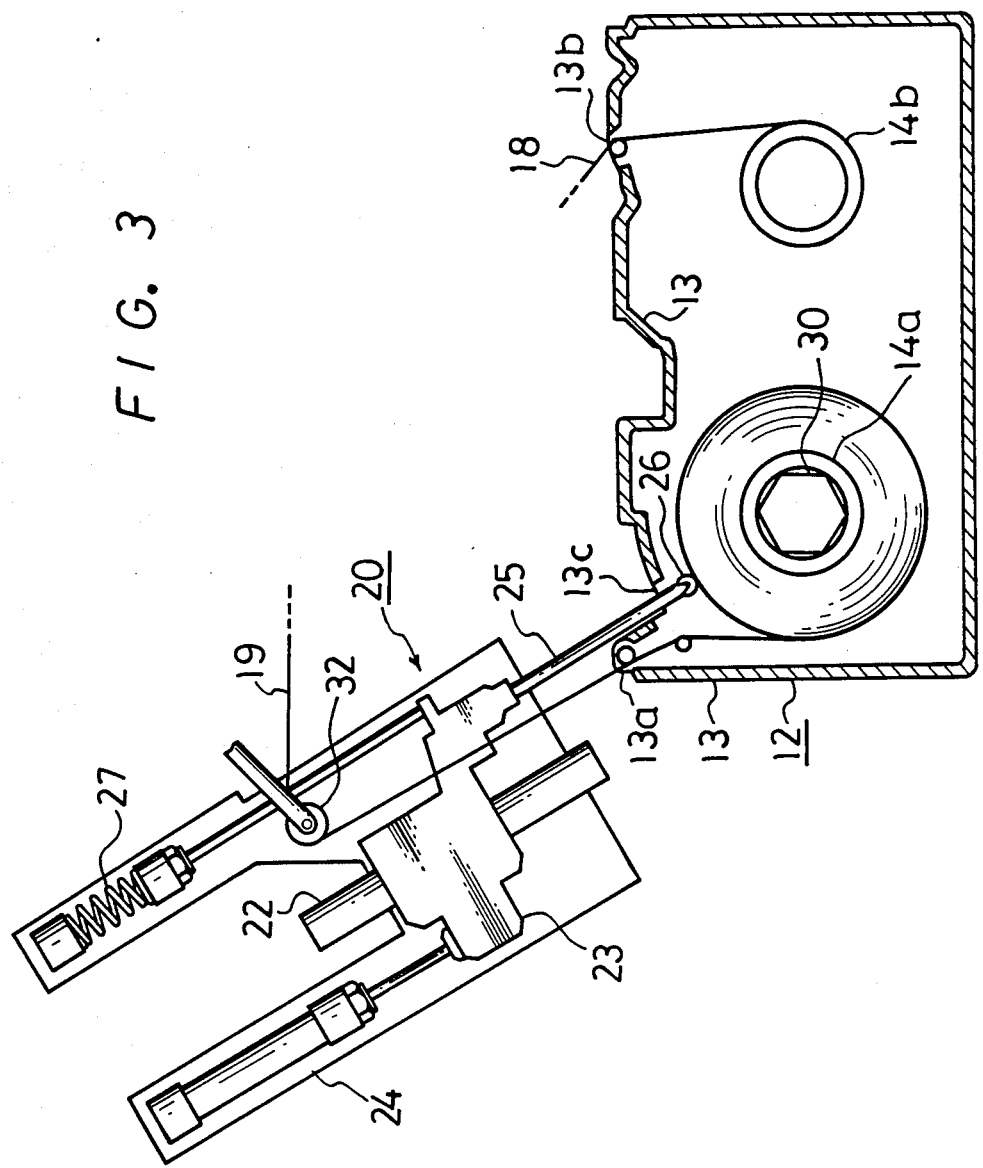

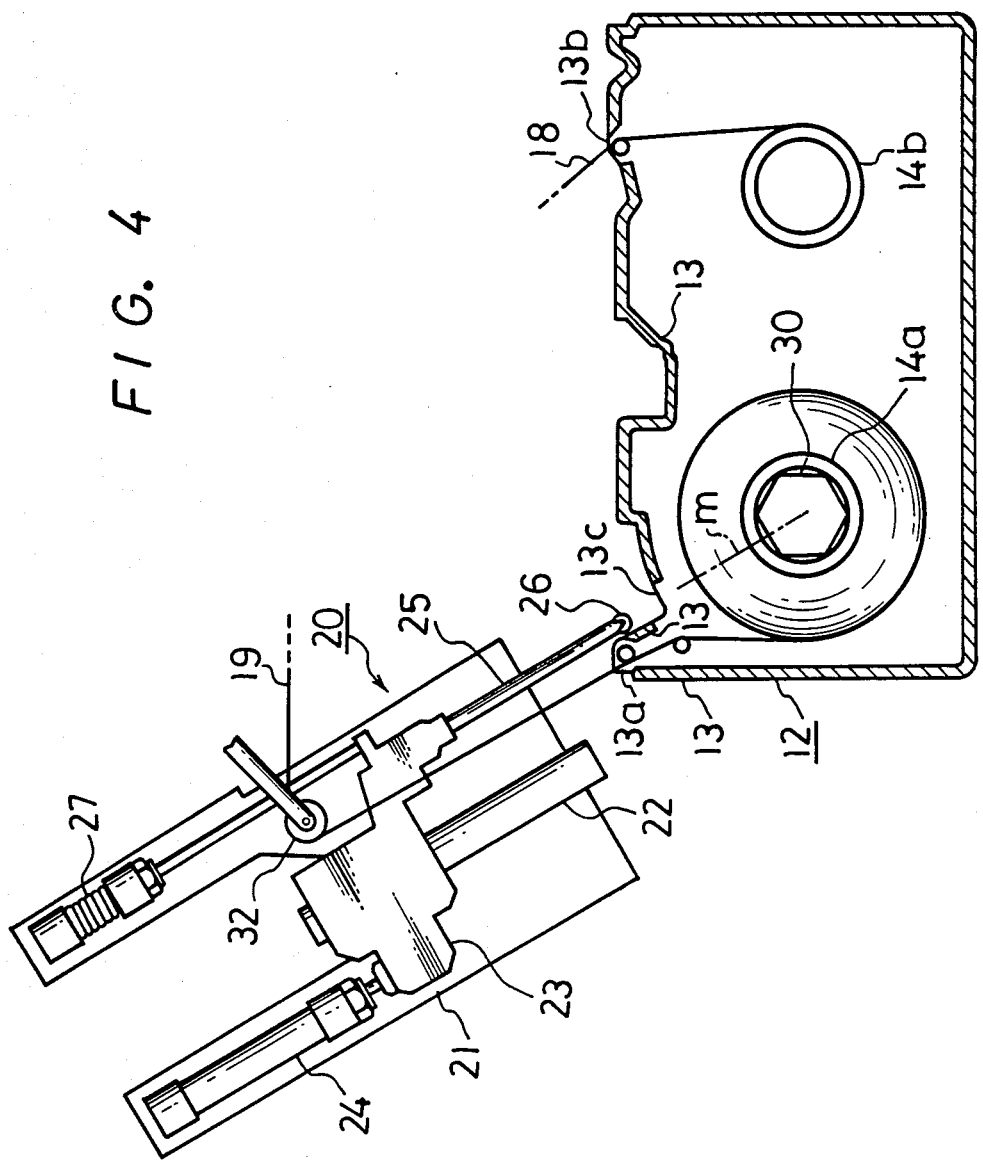

APPARATUS HAVING MEANS FOR UNLOOSENLY WINDING A TAPE TO REELS OF A TAPE CASSETTE

BACKGROUND OF THE INVENTION

1. Field of the Invention

The present invention relates to an apparatus having means for regularly and smoothly winding a magnetic tape on reels of a tape cassette while such reels are incorporated within a complete cassette housing.

2. Description of the Prior Art

In the prior art, a pair of reels having connected therebetween a leader tape are incorporated into a cassette housing. Then, a recorded magnetic tape or a blank magnetic tape is supplied to the above-mentioned tape cassette from the outside to be wound on the reels of the tape cassette for providing a complete video or audio tape cassette. More particularly, the reels having only the leader tape connected therebetween are rotatably secured within the cassette housing, the leader tape is withdrawn from the tape cassette housing in which the reels are rotatably secured, the magnetic tape supplied from the outside is connected to the withdrawn leader tape and the thus connected magnetic tape is wound on the reels of the tape cassette.

FIG. 1 illustrates an example of a conventional apparatus for carrying out the above-mentioned tape winding operation. This conventional tape winding apparatus is disclosed in Japanese Published Patent Application No. 49-30444. In FIG. 1, reference numeral 1 generally designates an overall arrangement of such a conventional tape winding apparatus. A cassette holder 2 is secured on the front of this tape winding apparatus 1, and a tape cassette 3, in which only a leader tape 4 is connected between its reels, is loaded onto this cassette holder 2. A tape supporting unit 5 and a first splice unit 6 are located in the vicinity of the tape cassette 3. The tape supporting unit 5 is not movable, while the first splice unit 6 is pivotably supported at its rotation shaft 6a and is movable about such shaft in the direction of the arrow A; so as to be spaced apart from the tape supporting unit 5. Above the tape supporting unit 5, there are provided second and third splice units 7 and 8 which are pivoted about respective rotation shafts 7a and 8a. When being rotated in the directions of the arrows B and C, the second and third splice units 7 and 8 are brought in contact with the tape supporting unit 5. Further, in this tape winding apparatus 1, a magnetic tape 10 wound around a large reel 9 is withdrawn from the reel 9 and supplied through a tension applying device 11 to the second splice unit 7. A splice tape (not shown) is wound around a reel 8b within the third splice unit 8.

The conventional tape winding apparatus 1 operates as follows: When the magnetic tape 10 to be wound on the reels of the tape cassette 3, the leader tape 4 is first withdrawn from the tape cassette 3 held on the cassette holder 2, and the thus withdrawn leader tape 4 is passed through the tape supporting unit 5 and the first splice unit 6. Then, the leader tape 4 is cut by the first splice unit 6, and severed end portions of the leader tape 4 thus cut are respectively supported by the tape supporting unit 5 and the first splice unit 6. Thereafter, the first splice unit 6 is rotated in the direction of the arrow A so as to be spaced apart from the tape supporting unit 5. The second and third splice units 7 and 8 are then respectively rotated in the directions of he arrows B and C so as to come in contact with the tape supporting unit 5, wherein the end portion of the magnetic tape 10 supplied to the second splice unit 7 is connected, by means of the splice tape (not shown) supplied from the third splice unit 8, to one severed end of the leader tape 4 supported by the tape-supporting unit 5.

At the completion of the above-mentioned connecting or splicing step, the third splice unit 8 is returned to its original position. Then, one reel 3a of the tape cassette 3 is rotated at high speed to wind therearound a predetermined amount of the magnetic tape 10 transported from the large reel 9. During such winding, the tension applying device 11 applies a predetermined tension to the magnetic tape 10 so that the magnetic tape 10 is wound on the reel 3a under such tension. At the completion of this winding, the magnetic tape 10 is cut by the second splice unit and the end portion of the thus cut magnetic tape 10 wound into the tape cassette 3 is supported by the tape supporting unit 5. Thereafter, the second splice unit 7 is angularly returned to its original position. Then, the first and third splice units 6 and 8 are again rotated in the respective directions so as to be brought in contact with the tape supporting unit 5, and the severed end portion of the leader tape 4 supported by the first splice unit 6 is connected by means of the splice tape (not shown) to the end portion of the magnetic tape 10 supported by the tape supporting unit 5. The thus spliced tape is removed from the tape supporting unit 5 and the first splice unit 6, and the reel 3a of the tape cassette 3 is rotated to complete winding of the tape on the reels of the tape cassette 3.

In this way, the tape winding apparatus 1 operates to wind the magnetic tape 10 on the reels of the tape cassette 3 whereby the manufacture of a tape cassette containing the magnetic tape 10 is completed.

However, since the magnetic tape 10 is wound on the reel 3a of the tape cassette 3 at high speed, the winding of the magnetic tape 10 tends to be very susceptible to irregularities. The tension applying device 11 is intended to avoid such defect, but the application of the tension to the magnetic tape 10 by the tension applying device 22 is not sufficient to fully prevent distortion of the winding of the magnetic tape 10, particularly at high winding speeds.

OBJECTS AND SUMMARY OF THE INVENTION

Accordingly, an object of the present invention is to provide an improved apparatus having means for smoothly winding a tape on reels of a tape cassette and for avoiding looseness in the wound tape.

Another object of the present invention is to provide an apparatus having means for smoothly winding a tape on reels of a tape cassette and by which a magnetic tape can be satisfactorily wound on the reels while contained within the tape cassette housing without distortions or looseness.

According to one aspect of the present invention, there is provided an apparatus for smoothly winding a magnetic tape on reels of a tape cassette comprising: cassette holder means for holding thereon a tape cassette in which a pair of reels are rotatably incorporated and a leader tape is wound on the pair of reels; reel drive means engageable with one of said pair of reels when said tape cassette is loaded on said cassette holder means; means, for example, constituted by a pair of guide rollers, for withdrawing said leader tape from said tape cassette; splice means for cutting said withdrawn leader tape and for splicing one end of said cut leader tape to a magnetic tape supplied from the outside; and winding smoothing means operable to come in contact with a tape winding face of said one reel and with successive turns of the magnetic tape wound on said face so that said magnetic tape is regularly and smoothly wound on said reel and looseness of the wound tape is avoided.

BRIEF DESCRIPTION OF THE DRAWINGS

A better understanding of the objects, features and advantages of the present invention can be gained from a consideration of the following detailed description of the preferred embodiment thereof, when read in conjunction with the figures of the accompanying drawings, wherein:

FIG. 2 is a schematic representation of an apparatus having means for smoothly and regularly winding a tape on reels of a tape cassette according to an embodiment of the present invention; and FIGS. 3 and 4 are schematic representations similar to FIG. 2, but illustrating the apparatus in other phases of its operation.

DETAILED DESCRIPTION OF THE PREFERRED EMBODIMENT

Figure 1:
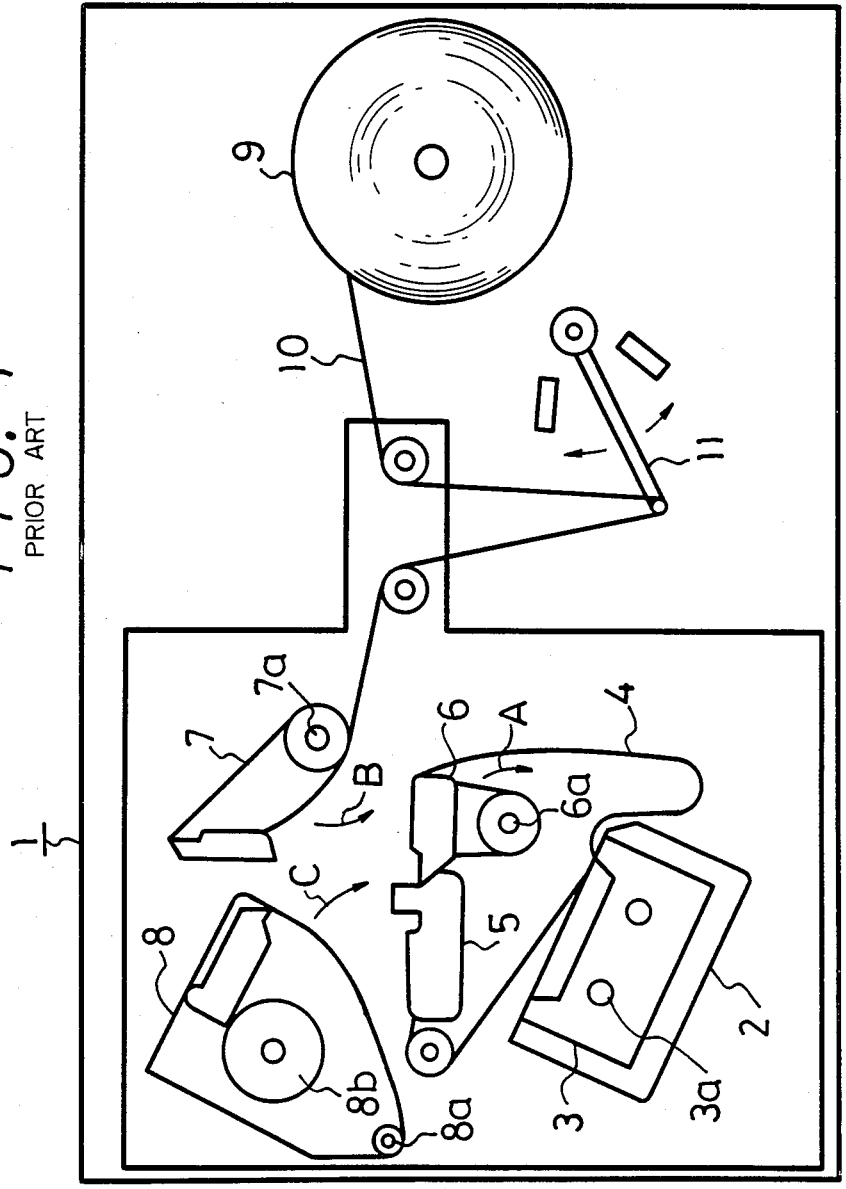
FIG. 1 is a schematic representation of a known apparatus for winding a tape on reels of a tape cassette while such reels are contained within a complete cassette housing.

Now, an embodiment of an apparatus having means for smoothly winding a tape on reels of a tape cassette according to the present invention will be described with reference to FIGS. 2 to 4.

In the apparatus according to this embodiment, a magnetic tape is smoothly wound on reels of a video tape cassette 12 shown in FIG. 2 so as to provide a complete tape cassette. In the video tape cassette 12, reels 14a and 14b are rotatably secured within a cassette housing so as to be encircled by a side wall 13. Three spaced openings 13a, 13b and 13c are formed through the side wall 13, and guide rollers 15 and 16 are provided within the tape cassette 12 in the vicinity of the opening 13a, as shown in FIG. 2. Within the tape cassette 12, there is also provided a guide roller 17 in the vicinity of the opening 13b. Opposite ends of a leader tape 18 are respectively engaged or secured with the reels 14a and 14b. The leader tape 18 thus secured at its ends travels from the reel 14a between the guide rollers 15 and 16, through the opening 13a and 13b and around the guide roller 17 to the reel 14b. The leader tape 18 is exposed outside of the tape cassette 12 between the openings 13a and 13b. In the initial state, the exposed leader tape 18 is stretched to follow a straight path between the openings 13a and 13b, or between the guide rollers 16 and 17. The opening 13c is located in the vicinity of the opening 13a.

An apparatus having means for smoothly winding the magnetic tape on the reels in the tape cassette 12 in accordance with an embodiment of the present invention is shown in FIG. 2 in a state in which the tape cassette 12 is held on a cassette holder (not shown) has been loaded onto the tape winding apparatus. In the state shown in FIG. 2, a reel drive shaft 30 is engated in the reel 14a, and a splice unit 31 for cutting the leader tape 18 and connecting or splicing the leader tape 18 with a magnetic tape is located in the vicinity of the portion of the leader tape 18 is exposed between the openings 13a and 13b of the tape cassette 12. Further, guide rollers 32 and 33 (shown in dot-dash lines on FIG. 2) and which are rotatably supported by a pair of arms 32a and 33a, are initially located between the exposed portion of the leader tape 18 and the side wall 13 of the tape cassette 12. The guide rollers 32 and 33 are used to withdraw the leader tape 18 from the cassette 12. More specifically after the tape cassette 12 is loaded onto the tape winding apparatus embodying the invention, the guide rollers 32 and 33 are moved in the directions of the arrows a and b so as to be spaced apart from the tape cassette 12 in the positions shown in full lines on FIG. 2. By the above-mentioned movement of the guide rollers 32 and 33, the leader tape 18 is withdrawn as illustrated in full lines on FIG. 2. With the leader tape 18 withdrawn as set forth above, the leader tape 18 is brought into contact with the splice unit 31. After the splice unit 31 is spaced apart from the tape cassette 12 in the direction shown by an arrow c, the leader tape 18 is severed and connected to the magnetic tape by the splice unit 31.

Further, as FIG. 4, a winding smoothing unit 20 is located in opposing relation to the opening 13c of the side wall 13 of the tape cassette 12. The winding smoothing unit 20 is mounted on a block 21 and the block 21 can be moved up and down in directions perpendicular to the plane of the paper in FIGS. 2-4, as by an elevating cylinder (not shown). As FIGS. 2 through 4 show, the block 21 is brought to the same height as the tape cassette 12 by the elevating cylinder from a normal position lower than the tape cassette 12. On the block 21, there is mounted a winding roller support member 23 which can be moved rectilinearly along a guide rail 22. In FIG. 4, the line m connects the opening 13c and the center of the reel 14a and the moving direction of the winding roller support member 23 along the guide rail 22 is parallel to the radial line m. The support member 23 is coupled to a cylinder 24 and can be moved along a straight path parallel to the line m by fluid-pressure acting in the cylinder 24. Whenever the necessity arises, the cylinder 24 is set free, that is, the fluid pressure is released therefrom, so that the support member 23 can be moved along the guide rail 22 by another force applied thereto from outside the cylinder 24. An arm 25 is fixed at one end to the support member 23 and a winding control or smoothing roller 26 is rotatably supported at the other end of the arm 25. The arm 25 with the winding control or smoothing roller 26 is located along an extension of the radial line m connecting the above-mentioned opening 13c and the center of the reel 14a. When the block 21 is positioned at substantially the same height as the tape cassette 12 by the elevating cylinder, if the winding roller support member 23 is pushed downwardly by extension of the rod from the cylinder 24 as shown in FIG. 2, the winding smoothing roller 26 is inserted through the opening 13c into the tape cassette 12 and is brought into contact with the periphery or tape winding face of the reel 14a. A coil spring 27 is interposed between an abutment on the block 21 and the support member 23. When the cylinder 24 is set free, the coil spring 27 pushes the supporting member 23 toward the reel 14a. Apart from the above described arrangements, the tape winding apparatus embodying this invention comprises components which are the same as those of the conventional tape winding apparatus, for example, as described with reference to FIG. 1.

In the tape winding apparatus according to the embodiment of the invention constructed as set forth above, when the magnetic tape is to be wound on the reel 14a of the tape cassette 12, the guide rollers 32 and 33 are moved from their locations near the tape cassette 12, as shown by dot-dash lines in FIG. 2, in the directions indicated by the arrows a and b to the positions shown in full lines so as to withdraw the leader tape 18 out of the tape cassette 12. At that time, the winding unit 20 has its arms 25 is retracted (as shown in FIG. 4) by the cylinder 24 and is also placed at the position or level lower than the tape cassette 12 by the elevating cylinder. In this state, or phase of operation, the splice unit 31 is spaced apart from the tape cassette 12 in the direction shown by the arrow c in FIG. 2 and splices or connects the leader tape 18 with the magnetic tape supplied from an external reel (not shown). After the completion of the splicing operation, the elevating cylinder moves the winding unit 20 to substantially the same height as the tape cassette 12. Then, the cylinder 24 is actuated and slidably moves the support member 23 toward the tape cassette 12 to thereby insert the arm 25 supported by the support member 23 and the winding smoothing roller 26 on the arm 25 through the opening 13c into the tape cassette 12, wherein the winding smoothing roller 26 is brought in contact with the peripheral or tape winding face of the reel 14a (for example, as shown in FIG. 2).

When the winding smoothing roller 26 brought into contact with the tape winding face of the reel 14a, the cylinder 24 is set free so that the winding smoothing roller 26 is then pressed against the tape winding face of the reel 14a only by the spring force of the coil spring 27. In this condition, when the reel 14a is rotated at high speed by the reel drive shaft 30 as shown in FIG. 3, the magnetic tape 19 connected to the leader tape 18 is wound around the reel 14a. Although the radius of the tape wound on the reel 14a is gradually increased, the cylinder 24 is already set free so that the arm 25 is moved outwardly through the opening 13c in accordance with the increase of the radius of the tape wound on the reel 14a, while the winding smoothing roller 26 is continuously urged against the surface of the tape wound on the reel 14a by the spring force of the coil spring 27. After the winding of the magnetic tape 19 of a predetermined length on the reel 14a has been finished, the winding smoothing roller 26 is fully moved outside the tape cassette 12 by suitable actuation of the cylinder 24. Then, the elevating cylinder moves the winding unit 20 to the position lower than the tape cassette 12. After the end portion of the leader tape 18 connected to the reel 14b is spliced with the magnetic tape 19 by the splice unit 31, the guide rollers 32 and 33 are returned to the positions near the tape cassette 12 and the magnetic tape 19 and the leader tape 18 are pulled back to the inside of the tape cassette 12 for completing the winding operation.

It will be appreciated that, in accordance with the teachng of the present invention, when the magnetic tape 19 is wound around the reel 14a, the winding smoothing roller 26 is brought in contact with the surface of the tape wound on the reel 14a by the spring force of the coil spring 27 with the result that while the magnetic tape 19 is wound on the reel 14a the successive turns of the magnetic tape 19 are held in close contact with each other and with the reel 14a, thus making it possible to avoid looseness in the winding of the magnetic tape 19 on the reel 14a. Therefore, the magnetic tape 19 wound by use of the tape winding apparatus embodying the invention is always smoothly and regularly wound around the reel 14a.

While in the above-mentioned embodiment the roller 26 is used as the means which is brought in contact with the reel 14a, such roller may be replaced by a pad, a brush or the like attached to the end of the arm 25, so as to be similarly brought in contact with the magnetic tape wound on the reel 14a.

Although a single preferred embodiment of the invention has been described above by way of example, it will be apparent that many modifications and variations thereof could be effected by one with ordinary skill in the art without departing from the spirit and scope of the invention as defined by the appended claims.

We claim as our invention:

1. An apparatus for smoothly winding a magnetic tape on reels of a tape cassette comprising:
    (a) cassette holder means for holding thereon a tape cassette in which a pair of reels are rotatably incorporated and a leader tape is wound at its opposite end walls on said pair of reels;
    (b) reel drive means engageable with one of said pair of reels when said tape cassette is loaded on said cassette holder means;
    (c) means including a pair of guide rollers initially located in the vicinity of said tape cassette loaded in said cassette holder means and being movable away from said tape cassette for withdrawing said leader tape from said tape cassette;
    (d) splice means for cutting said withdrawn leader tape and for splicing one end of said cut leader tape to a magnetic tape supplied from the outside; and
    (e) winding smoothing means operable to come in contact with a tape winding face of said one reel and with successive turns of said magnetic wound on said face so that said magnetic tape is regularly and smoothly wound on said reel.

2. The apparatus according to claim 1, further comprising elevating means for moving said winding smoothing means in directions toward and away from said tape winding face.

3. An apparatus for smoothly winding a magnetic tape on reels of a tape cassette comprising:
    cassette holder means for holding thereon a tape cassette in which a pair of reels are rotatably incorporated and a leader tape is wound at its opposite ends on said pair of reels;
    reel drive means engageable with one of said pair of reels when said tape cassette is loaded on said cassette holder means;
    means for withdrawing said leader tape from said tape cassette;
    splice means for cutting said withdrawn leader tape and for splicing one end of said cut leader tape to a magnetic tape supplied from the outside; and
    winding smoothing means including contacting means for contacting a tape winding face of said one reel and successive turns of said magnetic tape wound on said face, means for supporting said contacting means at a free end, driving means for moving said supporting means such that said contacting means is moved toward and away from said tape winding face in directions radiating from a center of said one reel, and biasing means for urging said contacting means toward said tape winding face of said one reel by its biasing force.

4. The apparatus as claimed in claim 3, wherein said contacting means is a roller.

* * * * *